(12) United States Patent
Sumida et al.

(10) Patent No.: US 10,354,295 B2
(45) Date of Patent: Jul. 16, 2019

(54) RECEPTION SYSTEM AND RECEPTION METHOD

(71) Applicant: HONDA MOTOR CO., LTD., Tokyo (JP)

(72) Inventors: Naoaki Sumida, Wako (JP); Hiroshi Kondo, Wako (JP); Asuka Shiina, Wako (JP); Shunichi Yamamoto, Wako (JP); Kazuhiro Nakadai, Wako (JP); Keisuke Nakamura, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 145 days.

(21) Appl. No.: 15/465,985

(22) Filed: Mar. 22, 2017

(65) Prior Publication Data

US 2017/0278146 A1 Sep. 28, 2017

(30) Foreign Application Priority Data

Mar. 25, 2016 (JP) ................................. 2016-062556

(51) Int. Cl.
| | |
|---|---|
| *G06F 19/00* | (2018.01) |
| *G06Q 30/02* | (2012.01) |
| *H04M 3/46* | (2006.01) |
| *G06K 9/00* | (2006.01) |
| *G06K 9/62* | (2006.01) |
| *G06K 9/68* | (2006.01) |

(52) U.S. Cl.
CPC ..... *G06Q 30/0281* (2013.01); *G06K 9/00288* (2013.01); *G06K 9/6222* (2013.01); *G06K 9/68* (2013.01); *H04M 3/46* (2013.01); *H04M 3/465* (2013.01); *H04M 2203/551* (2013.01)

(58) Field of Classification Search
CPC .......... G06Q 30/0281; G06K 9/00288; G06K 9/6222; G06K 9/68; H04M 3/46; H04M 7/0012; H04M 2203/551; H04M 3/04

USPC .................................................. 700/245, 259
See application file for complete search history.

(56) References Cited

U.S. PATENT DOCUMENTS

| | | | |
|---|---|---|---|
| 2004/0064351 A1* | 4/2004 | Mikurak | G06Q 10/087 705/22 |
| 2005/0084086 A1* | 4/2005 | Hesse | H04L 12/1818 379/202.01 |
| 2007/0285504 A1* | 12/2007 | Hesse | H04N 7/15 348/14.08 |

FOREIGN PATENT DOCUMENTS

JP          4594857          9/2010

* cited by examiner

*Primary Examiner* — Ronnie M Mancho
(74) *Attorney, Agent, or Firm* — Rankin, Hill & Clark LLP

(57) ABSTRACT

A reception system includes: a visitor recognition unit that recognizes a visitor; a receiving person recognition unit that recognizes a receiving person that corresponds to the visitor; a receiving person contact information storage unit that stores contact information of the receiving person; a notification unit that notifies the receiving person of a visit of the visitor at the contact information of the receiving person stored by the receiving person contact information storage unit; and a receiving person selection unit that selects a substitute receiving person associated with the receiving person in a case where the receiving person is absent when the notification unit notifies the receiving person at the contact information of the receiving person, wherein the notification unit notifies the substitute receiving person selected by the receiving person selection unit when the receiving person is absent.

10 Claims, 8 Drawing Sheets

FIG. 3

| PERSON ID | NAME | AFFILIATION | CHIEF | SPECIALIZED FIELD | DATE OF EMPLOYMENT | GENDER | ATTENDANCE STATE | MEETING HISTORY ||  OBSERVED HISTORY ||
|---|---|---|---|---|---|---|---|---|---|---|---|
| | | | | | | | | DATE | PERSON ID OF ATTENDEE | PERSON ID | LENGTH OF TIME |
| 1 | SHINZO TANAKA | FIFTH RESEARCH DIVISION | NO | CONTROL | 1998 | MALE | AT WORK | JANUARY 15 | 5, 11 | 5 | 7 |
| | | | | | | | | JANUARY 18 | 5, 21 | 11 | 1 |
| 2 | YOKO YAMADA | FIRST DESIGN DIVISION | NO | SOFTWARE | 2001 | FEMALE | ON BUSINESS TRIP | ... | ... | ... | ... |
| 3 | KAI WATANABE | FIFTH RESEARCH DIVISION | YES | STRUCTURE | 1993 | MALE | AT WORK | ... | ... | ... | ... |
| ... | ... | ... | ... | ... | ... | ... | ... | ... | ... | ... | ... |

FIG. 4

| PERSON ID | NAME | PHONE NUMBER | INFORMATION OF SUBSTITUTE RECEIVING PERSON | | | |
|---|---|---|---|---|---|---|
| | | | PRIORITY LEVEL 1 | | PRIORITY LEVEL 2 | PRIORITY LEVEL 3 |
| | | | NAME | PHONE NUMBER | | |
| 1 | SHINZO TANAKA | 070-XXXX-XXX0 | TARO SUZUKI | 070-XXXX-1XXX | ... | ... |
| 2 | YOKO YAMADA | 070-XXXX-XXX1 | ... | ... | ... | ... |
| 3 | KAI WATANABE | 070-XXXX-XXX2 | ... | ... | ... | ... |
| ... | ... | ... | ... | ... | ... | ... |

| PERSON ID | OUTGOING CALL HISTORY | | INCOMING CALL HISTORY | |
|---|---|---|---|---|
| | DATE | PERSON ID | DATE | PERSON ID |
| 1 | 13:33 ON FEBRUARY 2 | 5 | 17:57 ON FEBRUARY 5 | 5 |
| | 11:01 ON FEBRUARY 12 | 11 | 09:22 ON FEBRUARY 19 | 7 |
| | ... | ... | ... | ... |
| ... | ... | ... | ... | ... |

FIG. 7

| PERSON ID | FIRST-PLACE | CLOSENESS DEGREE 1 | SECOND-PLACE | CLOSENESS DEGREE 2 | THIRD-PLACE | CLOSENESS DEGREE 3 | ... |
|---|---|---|---|---|---|---|---|
| 1 | 132 | 98 | 123 | 76 | 23 | 55 | ... |
| 2 | 211 | 78 | 432 | 45 | 45 | 34 | ... |
| 3 | 65 | 87 | 245 | 56 | 16 | 35 | ... |
| ⋮ | ⋮ | ⋮ | ⋮ | ⋮ | ⋮ | ⋮ | ⋮ |

FIG. 9

| CANDIDATE | AFFILIATION OF VISITED PERSON IN CHARGE | NAME OF VISITED PERSON IN CHARGE |
|---|---|---|
| FIRST CANDIDATE | FIFTH RESEARCH DIVISION | SUZUKI |
| SECOND CANDIDATE | FOURTH RESEARCH DIVISION | WATANABE |
| THIRD CANDIDATE | FIFTH RESEARCH DIVISION | MORITA |
| NOT AVAILABLE | | |

RECEIVING PERSON IS ABSENT. THEREFORE, PLEASE SELECT SUBSTITUTE PERSON IN CHARGE FROM FOLLOWING.

RECEPTION SYSTEM AND RECEPTION METHOD

CROSS-REFERENCE TO RELATED APPLICATION

Priority is claimed on Japanese Patent Application No. 2016-062556, filed on Mar. 25, 2016, the contents of which are incorporated herein by reference.

BACKGROUND

Field of the Invention

The present invention relates to a reception system and a reception method.

Background

Generally, in a usual reception service in a company or the like, an operation is performed in which after asking a visitor's business, a receptionist calls a visited person (receiving person) by a telephone. Recently, an unmanned reception system is proposed in which a visitor operates a display unit provided on a reception counter or the like and which has a touch panel to thereby call a visited person by a telephone. A system is known in which a robot and an unmanned reception system are arranged at a reception, and the robot greets a visitor and prompts the visitor to operate the unmanned reception system by speech.

In a reception system using a robot that does not depend on the operation by a visitor, visitor information is stored in a storage means such as database, and when a visitor comes to the reception, a receiving person that corresponds to the visitor is specified based on ID information of the visitor. Then, in the reception system using a robot that does not depend on the operation by a visitor, the robot notifies the receiving person of the visitor's arrival via a telephone network (for example, refer to Japanese Patent No. 4594857).

SUMMARY

In the technique described in Japanese Patent No. 4594857, when a visitor visits, it is possible to call a receiving person via a telephone network. However, in the technique described in Japanese Patent No. 4594857, when the receiving person is absent, the same receiving person is called several times, and when the receiving person does not pick up the phone even after the same receiving person is called several times, an operator is contacted. Therefore, the visitor is caused to wait, and therefore, improvements are desired.

An object of an aspect of the present invention is to provide a reception system and a reception method capable of reducing a time during which a visitor is caused to wait.

(1) A reception system according to an aspect of the present invention includes: a visitor recognition unit that recognizes a visitor; a receiving person recognition unit that recognizes a receiving person that corresponds to the visitor; a receiving person contact information storage unit that stores contact information of the receiving person; a notification unit that notifies the receiving person of a visit of the visitor at the contact information of the receiving person stored by the receiving person contact information storage unit; and a receiving person selection unit that selects a substitute receiving person associated with the receiving person in a case where the receiving person is absent when the notification unit notifies the receiving person at the contact information of the receiving person, wherein the notification unit notifies the substitute receiving person selected by the receiving person selection unit when the receiving person is absent.

(2) In the above reception system, the receiving person selection unit may set the substitute receiving person depending on information based on an attendance state of the receiving person.

(3) In the above reception system, the receiving person selection unit may set the substitute receiving person based on a social graph indicating a relationship between the receiving person and a person associated with the receiving person.

(4) In the above reception system, the social graph may include a closeness degree representing the strength of the relationship between the receiving person and the person associated with the receiving person, and the receiving person selection unit may set the substitute receiving person in the order of highest to lowest of the closeness degree.

(5) In the above reception system, the receiving person selection unit may calculate the closeness degree by using at least one of an outgoing call history and an incoming call history of an extension phone of the receiving person.

(6) In the above reception system, the receiving person selection unit may calculate the closeness degree based on a meeting history attended by the receiving person.

(7) In the above reception system, the receiving person selection unit may set a plurality of the substitute receiving persons in the order of highest to lowest of the closeness degree and may notify, when the receiving person is absent, the selected plurality of the substitute receiving persons simultaneously of a visit of the visitor via the notification unit.

(8) The above reception system may include: an imaging unit; and an image recognition unit that recognizes a person based on an image captured by the imaging unit, wherein the receiving person selection unit may calculate, based on a result recognized by the image recognition unit, at least one of the length of time and the number of times for which the person associated with the receiving person is together with the receiving person and may calculate the closeness degree based on at least one of the calculated length of time and the calculated number of times.

(9) The above reception system may include: an image display unit; and a touch panel input unit, wherein the receiving person selection unit may display names of a plurality of persons having a strong relationship with the receiving person on the image display unit and may set, as the substitute receiving person, a person that corresponds to a name selected according to selection by the visitor.

(10) A reception method according to another aspect of the present invention is a reception method in a reception system having a receiving person contact information storage unit that stores contact information of a receiving person with respect to a visitor, the method including: (a) by way of a visitor recognition unit, recognizing the visitor; (b) by way of a receiving person recognition unit, recognizing a receiving person that corresponds to the visitor; (c) by way of a notification unit, notifying the receiving person of a visit of the visitor at the contact information of the receiving person stored by the receiving person contact information storage unit; (d) by way of a receiving person selection unit, selecting a substitute receiving person associated with the receiving person in a case where the receiving person is absent when notifying the receiving person at the contact information of the receiving person in (c); and (e) by way of the notification unit, notifying the substitute receiving person selected in (d) when the receiving person is absent.

According to the configuration (1) or (10) described above, it is possible to notify the substitute receiving person of the visit of the visitor when the receiving person is absent, and therefore, it is possible to reduce a time during which the visitor is caused to wait. Further, it is possible to save a response job performed by an operator or a receptionist.

According to the configuration (2) described above, it is possible to set an appropriate substitute receiving person depending on the attendance information of the receiving person.

According to the configuration (3) described above, it is possible to set a substitute receiving person having a close relationship with the receiving person based on the social graph.

According to the configuration (4) described above, it is possible to set a substitute receiving person having a close relationship with the receiving person based on the highness of the closeness degree.

According to the configuration (5) described above, it is possible to set a substitute receiving person based on the outgoing and incoming call history (at least one of the outgoing call history and the incoming call history) of the extension phone (alternatively, a telephone between staff members in a company), and therefore, it is possible to set a substitute receiving person having a deep relationship with the receiving person.

According to the configuration (6) described above, it is possible to set a substitute receiving person based on the meeting history attended by the receiving person, and therefore, it is possible to set a substitute receiving person having a deep relationship with the receiving person.

According to the configuration (7) described above, it is possible to notify the selected plurality of the substitute receiving persons simultaneously of a visit of the visitor, and therefore, it is possible to reduce the time during which the visitor is caused to wait even if one of the selected plurality of the substitute receiving persons is absent. Further, it is possible to save a response job performed by an operator or a receptionist.

According to the configuration (8) described above, it is possible to set a substitute receiving person having a deep relationship with the receiving person based on observed history based on the image recognition result.

According to the configuration (9) described above, it is possible to display the names of persons estimated to have a relationship with the receiving person on the image display unit and cause the visitor to select, and therefore, the visitor can set a desired substitute receiving person.

BRIEF DESCRIPTION OF THE DRAWINGS

FIG. 3 is a view showing an example of information stored by a receiving person contact information DB (database) according to the embodiment.

FIG. 4 is a view showing an example of information relating to a receiving person stored by the receiving person contact information DB according to the embodiment.

FIG. 7 is a view showing an example of a calculation result of a closeness degree for each person ID according to the embodiment.

FIG. 9 is a view showing an example of an image displayed on an image display unit at the time of substitute receiving person selection according to the embodiment.

DESCRIPTION OF THE EMBODIMENTS

Hereinafter, an embodiment of the present invention is described with reference to the drawings.

Figure 1:
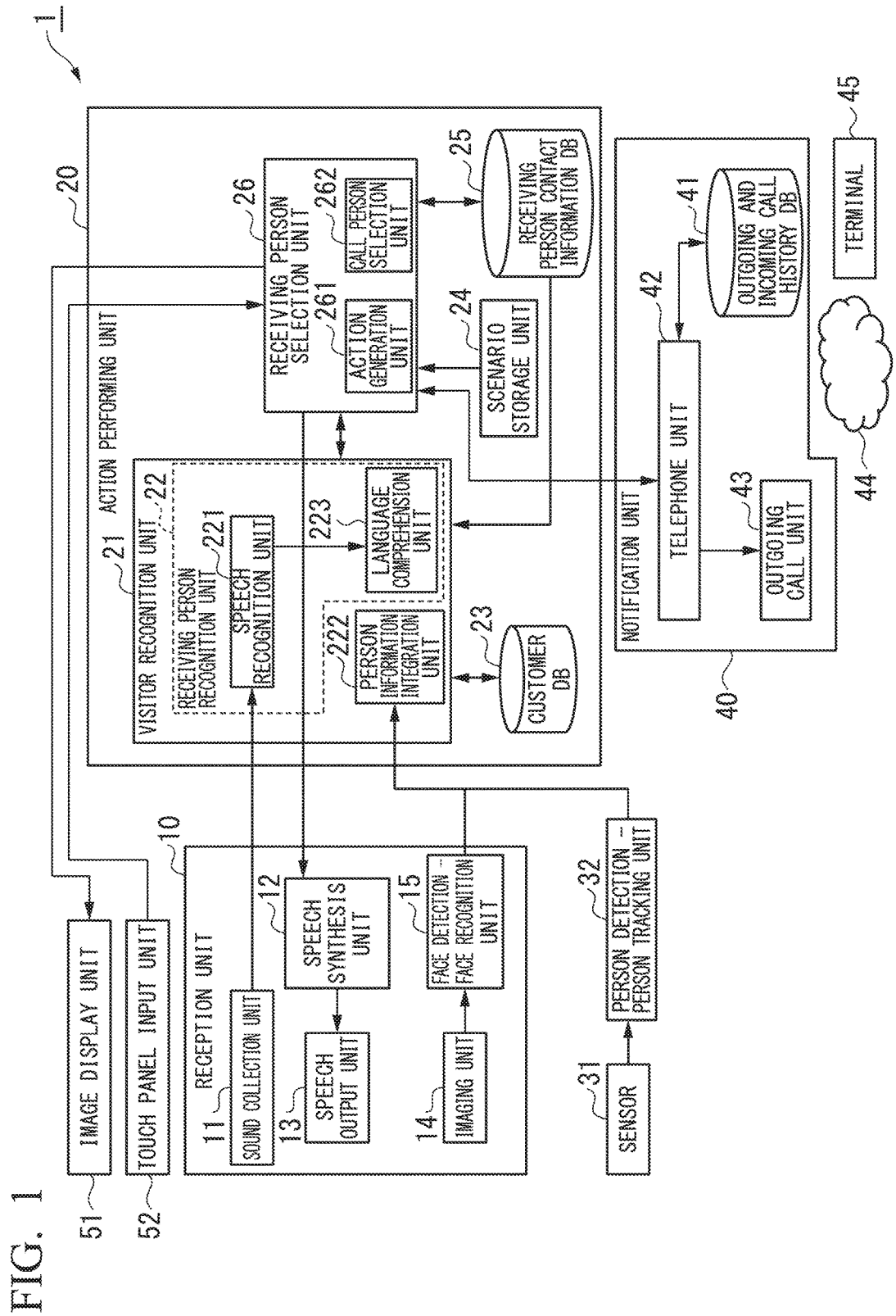
FIG. 1 is a system configuration view representing a configuration of a reception system according to an embodiment.

FIG. 1 is a system configuration view representing a configuration of a reception system 1 according to the present embodiment. As shown in FIG. 1, the reception system 1 includes a reception unit 10, an action performing unit 20, a sensor 31, a person detection-person tracking unit 32, a notification unit 40, a terminal 45, an image display unit 51, and a touch panel input unit 52.

The reception unit 10 includes a sound collection unit 11, a speech synthesis unit 12, a speech output unit 13, an imaging unit 14, and a face detection-face recognition unit 15 (image recognition unit).

The action performing unit 20 includes a visitor recognition unit 21, a receiving person recognition unit 22, a customer DB (database) 23, a scenario storage unit 24, a receiving person contact information DB (database) 25, and a receiving person selection unit 26. The visitor recognition unit 21 includes a speech recognition unit 221, a person information integration unit 222, and a language comprehension unit 223. The receiving person recognition unit 22 includes the speech recognition unit 221 and the language comprehension unit 223. The receiving person selection unit 26 includes an action generation unit 261 and a call person selection unit 262.

The notification unit 40 includes an outgoing and incoming call history DB (database) 41, a telephone unit 42, and an outgoing call unit 43. The notification unit 40 and the terminal 45 are connected to each other via a network 44.

The reception unit 10 is, for example, a humanoid robot. The reception unit 10 acquires speech of a visitor and outputs the acquired speech to the action performing unit 20. The reception unit 10 captures an image of a region that includes the face of the visitor, extracts an image of the face from the captured image, and outputs the extracted result to the action performing unit 20. The reception unit 10 converts speech information output by the action performing unit 20 into a speech signal and outputs the converted speech signal. The speech information includes greeting a visitor, explaining the role of the reception system 1, identifying a visitor, confirming the name of a receiving person, announcement of calling a receiving person, and the like. The reception unit 10 may include at least one of the action performing unit 20 and the notification unit 40. The reception unit 10 may not have a humanoid robot shape and may include the configuration of the reception unit 10.

The sound collection unit 11 is, for example, a microphone array that includes N (N is an integer equal to or more than two) or more microphones. The sound collection unit 11 converts a collected speech signal into an electric signal and outputs the converted speech signal to the speech recognition unit 221. The sound collection unit 11 may transmit a collected N channel speech signal to the speech recognition unit 221 in a wireless manner or in a wired manner. The speech signal may be synchronized between channels when being transmitted.

The speech synthesis unit 12 converts the speech information output by the action performing unit 20 into a speech signal and outputs the converted speech signal to the speech output unit 13.

The speech output unit 13 is, for example, a speaker. The speech output unit 13 produces the speech signal output by the speech synthesis unit 12.

The imaging unit 14 is, for example, a camera that uses a CCD (Charge Coupled Device) image sensor. The imaging unit 14 captures an image, for example, at a predetermined interval and outputs the captured image to the face detection—face recognition unit 15. The predetermined interval is, for example, an interval of 5 seconds.

The face detection-face recognition unit 15 detects and recognizes an image of a human face from the image output by the imaging unit 14 by using, for example, a Viola & Johns method (refer to Paul Viola and Michael J. Jones. Rapid Object Detection using a Boosted Cascade of Simple Features. IEEE CVPR, 2001.). The face detection—face recognition unit 15 outputs information indicating the detected and recognized result to the person information integration unit 222.

The sensor 31 is, for example, a plurality of LRF (Laser Range Finder) sensors provided on a ceiling. The LRF sensor is a three-dimensional area measurement sensor that scans a detection target space at a predetermined pitch while irradiating the space with laser light and that measures a time until the laser light is reflected by an object and returns to thereby detect the distance and direction to the object. The sensor 31 measures information of a distance measurement point including the detected distance and direction to the object and outputs the measured information of the distance measurement point to the person detection-person tracking unit 32. The information of the distance measurement point includes an x-axis component, a y-axis component, and a z-axis component. The plurality of LRF sensors are arranged at a position where it is possible to look down on a person, for example, on a ceiling, a wall, or the like of the detection target space such that parts of the detection target spaces are overlapped with each other. The present embodiment is described using an example in which the LRF sensor is used as an example of the sensor 31; however, the sensor is not limited thereto. The sensor may be another sensor.

The person detection-person tracking unit 32 uses the information of the distance measurement point output by the sensor 31 and classifies the distance measurement point into cluster data at a predetermined period, for example, according to a hierarchical method such as the shortest distance method.

The person detection-person tracking unit 32 calculates a centroid position for each classified cluster and treats the calculated centroid position as information indicating the position of the visitor. The person detection-person tracking unit 32 integrates the classified cluster data. The person detection-person tracking unit 32 allocates an identifier (ID) for each person by using the integrated cluster data. The person detection-person tracking unit 32 performs tracking with respect to person cluster data for which the ID is allocated. The tracking is performed, for example, by using a result of classification of a projected point of the distance measurement point on the xy plane and the centroid position of the cluster. The person detection-person tracking unit 32 outputs the information indicating the detected and tracked result to the person information integration unit 222.

The speech recognition unit 221 performs a sound source localization process, a noise suppression process, a speech zone detection process, a sound source separation process, and a speech recognition process with respect to the speech signal output by the sound collection unit 11. The speech recognition unit 221 calculates a spatial spectrum indicating a power of each direction by using a transfer function stored by the speech recognition unit 221, for example, using a multiple signal classification (MUSIC) method with respect to the N channel speech signal output by the sound collection unit 11. The speech recognition unit 221 determines a sound source direction of each sound source based on the spatial spectrum. The speech recognition unit 221 suppresses reverberation, for example, according to a reverse filter process of an in-room impulse response. The speech recognition unit 221 detects a speech zone, for example, by using a threshold value stored by the speech recognition unit 221 and extracts the N channel speech signal and sound source direction information in the speech zone detected from the N channel speech signal. The speech recognition unit 221 separates the N channel speech signal into sound source-specific speech signals as a speech signal of each sound source based on the sound source directions indicated by the sound source direction information by using, for example, a geometric-constrained high-order decorrelation-based source separation (GHDSS) method. The speech recognition unit 221 outputs the recognized result to the language comprehension unit 223.

The person information integration unit 222 acquires information indicating the detected and recognized result output by the face detection-face recognition unit 15 and information indicating the detected and tracked result output by the person detection—person tracking unit 32 and integrates the acquired information.

The language comprehension unit 223 calculates a speech feature quantity of the separated speech signal of the frame with respect to the recognized result output by the speech recognition unit 221. The language comprehension unit 223 performs a language comprehension process by using the calculated speech feature quantity and a speech recognition model stored by the language comprehension unit 223. The language comprehension unit 223 determines a word having the highest likelihood calculated by using the speech recognition model as a recognition result for the calculated speech feature quantity. The language comprehension unit 223 generates text data representing the recognition result as the speech contents of each sound source. The language comprehension unit 223 performs a dependency parsing with respect to the text data and extracts a noun.

The customer DB 23 stores a company name of a customer in association with an affiliation and a name. When the visitor recognition unit 21 acquires information (company name, affiliation, name) that is not stored by the customer DB 23, the visitor recognition unit 21 may update the information stored by the customer DB 23.

When a person is recognized in a predetermined range of the reception unit 10 for a predetermined time or more based on the information integrated by the person information integration unit 222, the visitor recognition unit 21 determines that a person is present in front of the reception unit 10 and outputs visit information indicating a visit of a person to the receiving person selection unit 26. When the action generation unit 261 starts to produce the speech information indicating inquiry about things to be done, the visitor recognition unit 21 extracts a noun indicating the affiliation of the customer (company name, department name, and the like) and a noun indicating the name of the customer with respect to the noun of the text data recognized by the language comprehension unit 223 with reference to a customer database stored by the customer DB 23. The visitor recognition unit 21 outputs the extracted noun indicating the affiliation of the customer and the extracted noun indicating the name of the customer to the receiving person selection unit 26.

When the action generation unit 261 starts to produce the speech information indicating inquiry about things to be done, the receiving person recognition unit 22 extracts a noun excluding the noun indicating the affiliation of the customer and the noun indicating the name of the customer, from the noun of the text data. The receiving person recognition unit 22 extracts a noun indicating the affiliation of the receiving person and a noun indicating the name of the receiving person with respect to the extracted noun with reference to a staff database stored by the receiving person contact information DB 25. The receiving person recognition unit 22 outputs the extracted noun indicating the affiliation of the receiving person and the extracted noun indicating the name of the receiving person to the receiving person selection unit 26.

The scenario storage unit 24 stores a response scenario to a visitor. The response scenario to a visitor is, for example, a text file including greeting a visitor, explaining the role of the reception system 1, identifying a visitor, confirming the name of a receiving person, announcement of calling a receiving person, and the like and which includes the order thereof.

The receiving person contact information DB 25 contains information regarding a staff member, outgoing and incoming call history using an in-company telephone, a social graph, the priority level of a substitute receiving person, and the like. The information stored by the receiving person contact information DB 25 is described below.

When the receiving person selection unit 26 recognizes that a person is present in front of the reception unit 10, the receiving person selection unit 26 generates an action based on the scenario stored by the scenario storage unit 24. The receiving person selection unit 26 extracts a phone number that corresponds to the receiving person by searching the receiving person contact information DB 25 and outputs the extracted phone number to the notification unit 40. When the receiving person is absent, the receiving person selection unit 26 extracts a phone number that corresponds to the substitute receiving person by searching the receiving person contact information DB 25 and outputs the extracted phone number to the notification unit 40. The "absence" is a state in which the receiving person is not at work, a state in which the receiving person is out or on a business trip, a state in which the receiving person cannot answer the phone because the receiving person is on a break or the like, a state in which a call to the receiving person is made but connection is not made, and the like. When the number of candidates of the substitute receiving person is two or more, the receiving person selection unit 26 may generate image information that includes information of a plurality of substitute receiving person candidates and may output the generated image information to the image display unit 51. The receiving person selection unit 26 may determine the receiving person candidate in response to the detection result detected by the touch panel input unit 52. The information of the substitute receiving person candidate includes, for example, the name and the affiliation of the substitute receiving person candidate and the like.

When the visitor recognition unit 21 recognizes that a person is present in front of the reception unit 10, the action generation unit 261 generates an action based on the scenario stored by the scenario storage unit 24. Specifically, when the action generation unit 261 recognizes that a person is present in front of the reception unit 10, the action generation unit 261 selects a text file of greeting a visitor and explaining the role of the reception system 1 from the scenario and outputs the selected text file to the speech synthesis unit 12. The action generation unit 261 selects a text file indicating inquiry about things to be done from the scenario, outputs the selected text file to the speech synthesis unit 12, and outputs, to the visitor recognition unit 21 and the receiving person recognition unit 22, information indicating that the text file indicating inquiry about things to be done has been output. When the visitor recognition unit 21 outputs the noun of the affiliation and the name of the visitor, and the receiving person recognition unit 22 outputs the noun of the affiliation and the name of the receiving person, the action generation unit 261 outputs a command of selecting the receiving person to the call person selection unit 262. When the visitor recognition unit 21 outputs the noun of the affiliation and the name of the visitor, and the receiving person recognition unit 22 outputs the noun of the affiliation and the name of the receiving person, the action generation unit 261 may select a text file of confirming the matter from the scenario and may output the selected text file to the speech synthesis unit 12. When the call person selection unit 262 outputs information indicating that the receiving person is absent and information indicating that a substitute receiving person is being called, the action generation unit 261 selects a text file indicating that the receiving person is absent and indicating that a substitute receiving person is being called from the scenario and outputs the selected text file to the speech synthesis unit 12. When phone response availability information output by the telephone unit 42 includes information indicating that there has been a response, the action generation unit 261 selects a text file indicating that the calling has been performed from the scenario and outputs the selected text file to the speech synthesis unit 12.

In response to a command of selecting the receiving person output by the action generation unit 261, the call person selection unit 262 acquires the noun of the affiliation and the name of the receiving person output by the receiving person recognition unit 22 and selects the acquired receiving person. Then, the call person selection unit 262 confirms an attendance state of the selected receiving person by searching the receiving person contact information DB 25. When the receiving person is at work, the call person selection unit 262 extracts a phone number that corresponds to the receiving person by searching the receiving person contact information DB 25 and outputs the extracted phone number to the notification unit 40. When the receiving person is not at work, or when the notification unit 40 calls the receiving person but there is no response, that is, the receiving person is absent, the call person selection unit 262 extracts a substitute receiving person associated with the receiving person by searching the receiving person contact information DB 25. When the substitute receiving person is selected, the call person selection unit 262 outputs the information indicating that the receiving person is absent and the information indicating that the substitute receiving person is being called to the action generation unit 261. The call person selection unit 262 extracts a phone number that corresponds to the selected substitute receiving person by searching the receiving person contact information DB 25 and outputs the extracted phone number to the notification unit 40. When the selected substitute receiving person does not answer the phone, the call person selection unit 262 selects a substitute receiving person having the next priority.

The network 44 is a network such as a telephone communication line, the Internet line, and a wireless line.

The notification unit 40 acquires the phone number output by the receiving person selection unit 26 and calls a terminal 45 that corresponds to the acquired phone number. The notification unit 40 generates phone response availability information indicating whether or not there has been a response to the phone and outputs the generated phone response availability information to the action generation unit 261.

The outgoing and incoming call history DB 41 stores an outgoing and incoming call history. The outgoing and incoming call history is a person called by the receiving person in the company, the number of times of the calling, information (at least one of the name, the phone number, and the identifier (ID)) of a person who calls the receiving person from within the company, and the number of times of the calling.

The telephone unit 42 acquires the phone number of the receiving person output by the receiving person selection unit 26 and controls the outgoing call unit 43 to call the terminal 45 that corresponds to the acquired phone number of the receiving person. The telephone unit 42 generates phone response availability information indicating whether or not there has been a response of the receiving person in a predetermined time and outputs the generated phone response availability information to the action generation unit 261. The telephone unit 42 acquires the phone number of the substitute receiving person output by the receiving person selection unit 26 and controls the outgoing call unit 43 to call the terminal 45 that corresponds to the acquired phone number of the substitute receiving person. The telephone unit 42 generates phone response availability information indicating whether or not there has been a response of the substitute receiving person in a predetermined time and outputs the generated phone response availability information to the action generation unit 261. The telephone unit 42 may determine that there has been no response of the receiving person when connection is made but the call is connected to an answering machine and the like. In this case, the telephone unit 42 may determine whether the call is connected to the answering machine or is connected to the receiving person by performing a speech recognition process.

The outgoing call unit 43 calls the terminal 45 via the network 44 in response to the control of the telephone unit 42.

The terminal 45 is a telephone set for which a phone number is allocated for each receiving person. The terminal 45 is, for example, a mobile phone. The terminal 45 may be a telephone set in use for an extension phone used in a company and the like.

The image display unit 51 is, for example, a liquid crystal display device, an organic EL (electroluminescence) display device, an electronic ink display device, and the like. Image information output by the receiving person selection unit 26 is displayed on the image display unit 51.

The touch panel input unit 52 is a touch panel sensor provided on the image display unit 51. The touch panel input unit 52 detects an operation result operated by a user and outputs the detected detection result to the receiving person selection unit 26.

Next, an outline of an operation of the reception system 1 is described.

Figure 2:
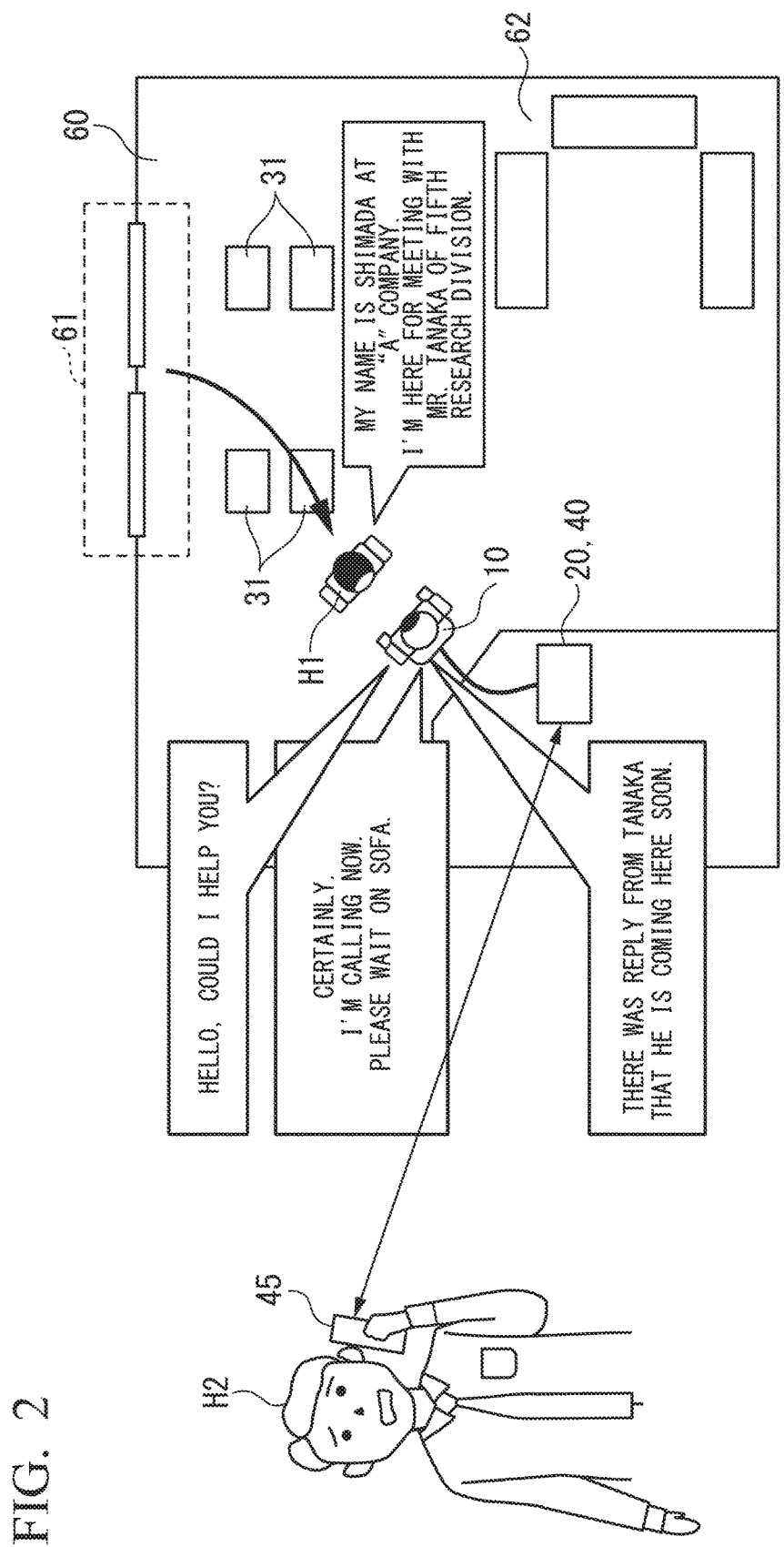
FIG. 2 is an image view of the reception system according to the embodiment.

FIG. 2 is an image view of the reception system 1 according to the present embodiment. In FIG. 2, a reception robot which is the reception unit 10, the action performing unit 20, the notification unit 40, and a sofa 62 are arranged on a reception 60. The sensor 31 is provided on a ceiling of the reception 60. Reference numeral 61 represents an entrance door of the reception 60.

When a visitor H1 enters the reception 60 from the door 61, the reception system 1 detects that the visitor H1 comes to the reception based on a detection value of the sensor 31 and an image of a face detected and recognized from an image captured by the imaging unit 14 provided on the reception robot.

Next, the reception system 1 produces a speech message, e.g., "Hello, could I help you?", of greeting a visitor and inquiring about things to be done in accordance with the scenario.

Next, the visitor H1 speaks his/her affiliation and name, the affiliation and name of the visited person, and the things to be done, for example, "My name is Shimada at A company. I'm here for a meeting with Mr. Tanaka of the fifth research division".

Next, the reception system 1 extracts the noun of the affiliation and the name of the visitor H1, and the noun of the affiliation and the name of a receiving person H2 from the speech signal which the visitor produces.

Next, the reception system 1 produces a speech message "Certainly. I'm calling now. Please wait on the sofa." indicating that a response is in progress in accordance with the scenario stored by the scenario storage unit 24 while calling the terminal 45 that corresponds to the phone number of the extracted receiving person H2.

The reception system 1 may produce a message, e.g., "May I call Mr. Tanaka of the fifth research division for you?" before calling the receiving person H2 and may call the receiving person H2 when there is a positive response such as "yes" or "exactly" from the visitor H1. Further, the reception system 1 may display a message, e.g., "May I call Mr. Tanaka of the fifth research division for you? Please say yes if it is correct or please say no if it is incorrect." on the image display unit 51. The selection of "Yes" or "No" described above can be selected by a finger operation of the visitor by using the touch panel input unit 52. In this way, it is possible to reduce the probability that the reception system 1 selects the wrong receiving person.

Next, the receiving person H2 responds to the phone call to the terminal 45. The reception system 1 may perform a noise suppression process on the speech message, e.g., "My name is Shimada at A company. I'm here for a meeting with Mr. Tanaka of the fifth research division" spoken by the visitor H1 and may produce the speech message on which the noise suppression process is performed. The reception system 1 may detect a speech zone with respect to the speech message spoken by the visitor H1, may separate the speech for each speech zone, and may produce the speech message. Thereby, the receiving person H2 can easily hear the speech message of the visitor H1.

When the receiving person H2 answers the phone, the reception system 1 performs a speech recognition process on the speech signal spoken by the receiving person H2.

As a result of speech recognition, when the speech includes that the receiving person H2 comes to the reception, the reception system 1 produces a speech message, e.g., "There was a reply from Mr. Tanaka that he is coming here soon." indicating that the receiving person H2 is coming to the reception 60 in accordance with the scenario. As a result of speech recognition, when the speech includes that the receiving person H2 cannot come to the reception immediately and therefore comes ten minutes later, the reception system 1 may produce a speech message "There was a reply from Mr. Tanaka that he is currently tied up and therefore will come here in ten minutes." indicating that the receiving person H2 will come to the reception 60 in ten minutes in accordance with the scenario.

When the receiving person H2 answers the phone, the receiving person H2 may reply to the visitor H1 via a push button operation of the telephone set (terminal 45). Specifically, the reception system 1 outputs a speech "Mr. Shimada at A company has arrived. Please push a button [1] to respond, button [2] if you will be slightly delayed, or a button [3] if you are unable to meet with him/her" to the receiving person. Then, the receiving person H2 may perform a push button operation of any of [1] to [3] depending on the situation. The push button operation result is forwarded to the reception system 1 from the terminal 45 of the receiving person H2. When the terminal 45 is a smartphone, the reception system 1 may have a configuration in which the terminal 45 is caused to display buttons with a character message of [1 response: possible], [2. response: delayed], and [3. response: unavailable] on the touch panel and one of the buttons can be selected by a finger operation of the receiving person H2.

When the receiving person H2 is absent, the reception system 1 selects a substitute receiving person and calls the terminal 45 of the selected substitute receiving person.

When a time is required until the receiving person H2 comes, in a case where the receiving person H2 is absent or the like, the reception system 1 first apologizes and explains circumstances in accordance with the scenario in order to reduce the stress of the waiting time of the visitor. Then, the reception system 1 may have a talk (robot initiative talk) such that the reception robot (reception unit 10) starts speech, may provide product commercials, or may provide a facility guide (location of a toilet, smoking area, drink corner, and the like).

Next, an example of the information stored by the receiving person contact information DB 25 is described.

FIG. 3 is a view showing an example of the information stored by the receiving person contact information DB 25 according to the present embodiment.

As shown in FIG. 3, in the information stored by the receiving person contact information DB 25, the person ID is associated with information indicating a name, information indicating an affiliation, information indicating whether or not the person is a chief, information indicating a specialized field, information indicating the date of employment, information indicating a gender, information indicating an attendance state, meeting history, and observed history.

The person ID is an identifier for identifying a staff member. The person ID may be, for example, a staff number or the like. The information indicating a name includes at least a last name of last and first names of the person that corresponds to the person ID. The information indicating an affiliation represents the affiliation of the person that corresponds to the person ID. The information indicating whether or not the person is a chief represents whether or not the person that corresponds to the person ID is a chief. The information indicating whether or not the person is a chief may include information by which the relationship with another person ID can be classified, such as information indicating a team leader, a sub team leader, a manager, a general manager, and the like. The information indicating a specialized field is information representing the field of work to which the person that corresponds to the person ID is assigned. The information indicating a specialized field is, for example, control, software, structure, accounting, clerical work, and the like. The information indicating the date of employment is information indicating the year when the person that corresponds to the person ID joined the company. The information indicating an attendance state indicates that the person that corresponds to the person ID is at work, is on a break, is out, is on a business trip, is on the holidays, or the like.

The meeting history is information indicating a history of the meeting attended by the person that corresponds to the person ID. The meeting history includes the date when the meeting was held and the person ID of the staff member that attended the meeting. The information of the meeting history is acquired, for example, from a server of an in-company meeting room reservation system.

The observed history includes a person ID of a person that is imaged together with the receiving person in the image captured by the imaging unit 14 of the reception robot and the length of time for which the person is together with the receiving person. The observed history may include a frequency (number of times) for which the person is together with the receiving person.

The example shown in FIG. 3 is an example, and the information stored by the receiving person contact information DB 25 is not limited thereto. For example, the receiving person contact information DB 25 may store the year when the person that corresponds to the person ID was born. The receiving person contact information DB 25 may store part of the information shown in FIG. 3.

Next, an example of information relating to a receiving person stored by the receiving person contact information DB 25 is described.

FIG. 4 is a view showing an example of the information relating to a receiving person stored by the receiving person contact information DB 25 according to the present embodiment.

As shown in FIG. 4, in the receiving person contact information DB 25, the person ID is associated with information of the name, the phone number, and the substitute receiving person that correspond to the person ID.

The phone number is a phone number of the terminal 45 that the person of the person ID has. The information of the substitute receiving person includes the name or the person ID and the phone number for each priority level. A generation method of the information of the substitute receiving person is described below.

Next, an example of an outgoing and incoming call history stored by the outgoing and incoming call history DB 41 is described.

Figures 5, 6:
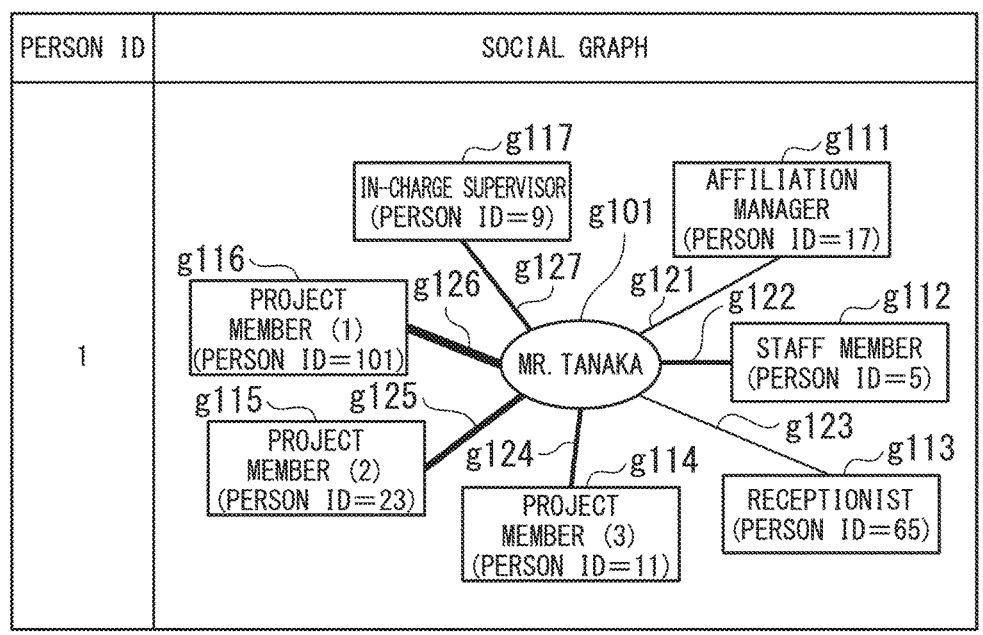
FIG. 5 is a view showing an example of an outgoing and incoming call history stored by an outgoing and incoming call history DB according to the embodiment.
FIG. 6 is an example showing a social graph generated by a receiving person selection unit according to the embodiment.

FIG. 5 is a view showing an example of the outgoing and incoming call history stored by the outgoing and incoming call history DB 41 according to the present embodiment.

As shown in FIG. 5, the outgoing and incoming call history DB 41 stores, for each person ID, the date when an outgoing call is made and a person ID of a person to which the outgoing call is made in an associated manner as an outgoing call history of the outgoing call performed by the receiving person. The outgoing and incoming call history DB 41 stores the date when an incoming call is made and a person ID of a person from which the incoming call is made in an associated manner as an incoming call history of the incoming call made to the receiving person.

Next, a social graph generated by the receiving person selection unit 26 is described.

FIG. 6 is an example showing a social graph generated by the receiving person selection unit 26 according to the present embodiment.

The example shown in FIG. 6 is an example of a social graph relating to Mr. Tanaka of the person ID=1. The social graph is a graph indicating a relationship between persons in the present embodiment.

In FIG. 6, reference numeral g101 represents a person having a person ID of 1. Reference numerals g111 to g117 represent seven persons having high association with the person having a person ID of 1. Reference numeral g121 represents the strength of the relationship between the person having a person ID of 1 and a person g111 (affiliation manager, person ID=17). Reference numeral g122 represents the strength of the relationship between the person having a person ID of 1 and a person g112 (staff member, person ID=5). Reference numeral g123 represents the strength of the relationship between the person having a person ID of 1 and a person g113 (receptionist, person ID=65). Reference numeral g124 represents the strength of the relationship between the person having a person ID of 1 and a person g114 (project member (3), person ID=11). Reference numeral g125 represents the strength of the relationship between the person having a person ID of 1 and a person g115 (project member (2), person ID=23). Reference numeral g126 represents the strength of the relationship between the person having a person ID of 1 and a person g116 (project member (1), person ID=101). Reference numeral g127 represents the strength of the relationship between the person having a person ID of 1 and a person g117 (in-charge supervisor, person ID=9). The width of lines g121 to g127 represents the strength of the relationship.

Next, a generation method of the social graph and a calculation method of the priority level of the substitute receiving person are described.

The receiving person selection unit 26 calculates the closeness degree between person IDs and determines the priority level in the order of highest to lowest of the closeness degree by using: the outgoing call history and the incoming call history shown in FIG. 5; the meeting history, the observed history, the date of employment, and the gender shown in FIG. 3; and information indicating whether or not a person is an in-charge chief of the person ID, information indicating whether or not a person is in the same affiliation (or group) as the person ID, and information indicating whether or not a person is in the same specialized field as the person ID.

The receiving person selection unit 26 compares affiliations of the person IDs stored by the receiving person contact information DB 25 and generates information indicating whether or not the persons are in the same affiliation (or group), which indicates one when the persons are in the same affiliation and which indicates zero when the persons are in different affiliations. The receiving person selection unit 26 compares the date of employment of the person IDs stored by the receiving person contact information DB 25 and generates information indicating whether or not the persons are in the same date of employment, which indicates zero when the persons are in the same date of employment and which indicates a value of 1 to 100 obtained by normalizing the difference between the dates of employment when the persons are in different employment years. For example, when the age of the youngest person is 18 years and the age of the oldest person is 63 years, the difference between the dates of employment is normalized assuming 45 years (=63−18) as 100. The receiving person selection unit 26 may provide a range, for example, of one year before and after the date of employment. For example, the person ID employed in 1989 to 1991 may be assumed in the same date of employment as the person ID employed in 1990. The receiving person selection unit 26 extracts affiliations of the person IDs stored by the receiving person contact information DB 25 and generates information indicating whether or not the person is an in-charge chief, which indicates one when the persons are in the same affiliation and the person is a chief (or senior) and which indicates zero when the persons are in the same affiliation or in different affiliations and the person is not a chief (or is not a senior). The receiving person selection unit 26 compares the gender of the person IDs stored by the receiving person contact information DB 25 and generates information indicating whether or not the persons are in the same gender, which indicates one when the persons have the same gender and which indicates zero when the persons are of different genders. The receiving person selection unit 26 compares specialized fields of the person IDs stored by the receiving person contact information DB 25 and generates information indicating whether or not the persons are in the same specialized field, which indicates one when the persons are in the same specialized field and which indicates zero when the persons are in different specialized fields.

In the present embodiment, the outgoing call history, the incoming call history, the meeting history, and the observed history are referred to as dynamic information. In the present embodiment, the information indicating whether or not the person is an in-charge chief, the information indicating whether or not the persons are in the same affiliation, and the information indicating whether or not the persons are in the same specialized field are referred to as quasi-static information. In the present embodiment, the information indicating whether or not the persons are in the same date of employment and the information indicating whether or not the persons are in the same gender are referred to as static information. The receiving person selection unit 26 acquires the outgoing call history and the incoming call history stored by the outgoing and incoming call history DB 41 from the telephone unit 42.

The receiving person selection unit 26 calculates the closeness degree by using the following Expression (1).

Closeness degree=Dynamic information (weighting summation Σ1)×Quasi-static information (weighting summation Σ2)×Static information (weighting summation Σ3)  (1)

Expression (1) is an example, and the expression is not limited thereto. For example, when the receiving person contact information DB 25 does not store the static information or when the static information is not used, the receiving person selection unit 26 may calculate the closeness degree by using the dynamic information and the quasi-static information. That is, in the present embodiment, the closeness degree is calculated by using at least one of the dynamic information, the quasi-static information, and the static information. The receiving person selection unit 26 may use at least one of the outgoing call history, the incoming call history, the meeting history, and the observed history as the dynamic information. Similarly, the receiving person selection unit 26 may use at least one of the information indicating whether or not the person is an in-charge chief, the information indicating whether or not the persons are in the same affiliation, and the information indicating whether or not the persons are in the same specialized field as the quasi-static information. The receiving person selection unit 26 may use at least one of the information indicating whether or not the persons are in the same date of employment and the information indicating whether or not the persons are in the same gender as the static information.

An example of a result of calculating the closeness degree is shown in FIG. 7.

FIG. 7 is a view showing an example of a calculation result of the closeness degree for each person ID according to the present embodiment. The strength of the relationship (the line width) in FIG. 6 corresponds to the value of the closeness degree shown in FIG. 7.

The receiving person selection unit 26 sorts the person in the order of highest to lowest of the closeness degree for each person ID and extracts, for example, the top seven persons. In FIG. 7, for example, in a case of a person ID of 1, the person ID is 132 and the closeness degree is 98 for a person having a first-place closeness degree, the person ID is 123 and the closeness degree is 76 for a person having a second-place closeness degree, and the person ID is 23 and the closeness degree is 55 for a person having a third-place closeness degree. When the calculated values of the closeness degree are the same, the receiving person selection unit 26 may perform weighting on each of the dynamic information, the quasi-static information, and the static information to prioritize information having the largest weighting and having a larger value and may perform prioritization based on, for example, the order of a name list, the alphabetical order, and the like.

Then, the receiving person selection unit 26 generates the social graph shown in FIG. 6 by using the calculation result shown in FIG. 7 and stores the generated social graph in the receiving person contact information DB 25. In this way, the receiving person contact information DB 25 stores the social graph for each person ID. The receiving person selection unit 26 may recalculate the closeness degree and update the social graph in response to the update of the outgoing call history and the incoming call history stored by the outgoing and incoming call history DB 41 and the meeting history and the observed history stored by the receiving person contact information DB 25. The receiving person selection unit 26 may store, in the receiving person contact information DB 25, the priority level generated based on the social graph in association with the person ID as shown in FIG. 4.

When the receiving person is absent, the receiving person selection unit 26 selects the substitute receiving person in the order of highest to lowest of the priority level with reference to the social graph generated in this way. The high closeness degree means that the person is in the same affiliation as the receiving person, that the person develops the same product as the receiving person, or that the person meets the receiving person at the meeting and the like for a long time, and therefore, there is a high possibility that the person shares information with the receiving person. Therefore, in the present embodiment, when the receiving person is absent (the receiving person is not at work, is on a break, is on a business trip or out, and does not answer the phone), the call from the visitor is forwarded to the person having a high closeness degree.

As described above, according to the present embodiment, the social graph is generated in accordance with the closeness degree calculated by using a variety of information (outgoing call history, incoming call history, affiliation, in-charge chief or not, specialized field, date of employment, gender, meeting history, observed history) for each person. In the present embodiment, when the receiving person is absent, it is possible to select the substitute receiving person in the order of highest to lowest of the priority level with reference to the social graph. Thereby, according to the present embodiment, when the receiving person is absent, a call is not forwarded to a person merely at a close seat, but the call can be forwarded to a person having a high closeness degree with the receiving person. Thereby, even when the receiving person is absent, the visitor can meet a person associated with the work of the receiving person.

Next, a process sequence of the reception system 1 is described.

Figure 8:
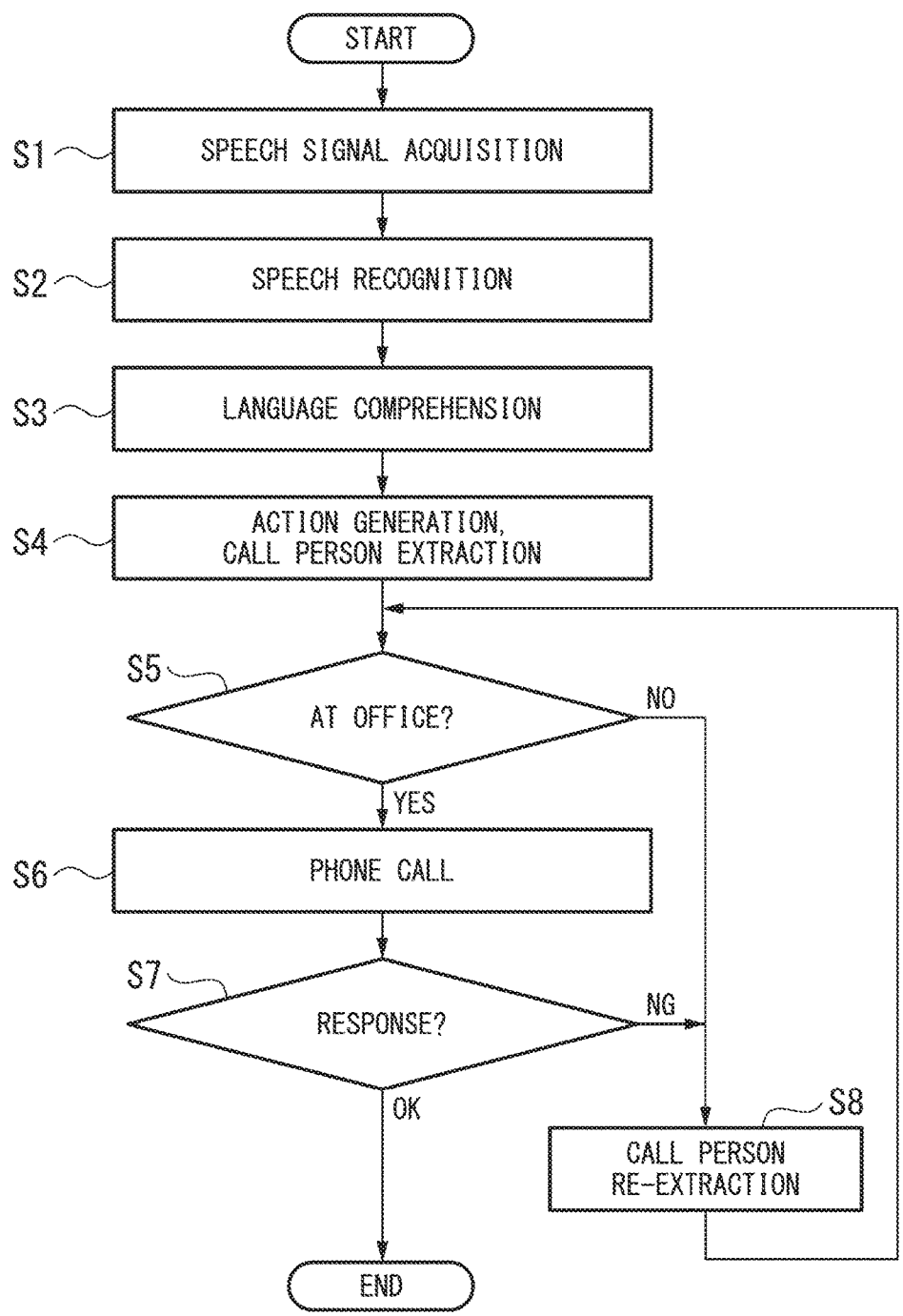
FIG. 8 is a flowchart of a process of a reception system according to the embodiment.

FIG. 8 is a flowchart of a process of the reception system 1 according to the present embodiment.

(Step S1) The visitor recognition unit 21 determines that a person is present in front of the reception unit 10 when a person is recognized in a predetermined range of the reception unit 10 for a predetermined time or more based on the information integrated by the person information integration unit 222 (visitor recognition step). Subsequently, the action generation unit 261 selects a text file of greeting a visitor and explaining the role of the reception system 1 from the scenario when the action generation unit 261 recognizes that a person is present in front of the reception unit 10. Subsequently, the action generation unit 261 selects a text file indicating inquiry about things to be done from the scenario and outputs the selected text file to the speech synthesis unit 12. Subsequently, the speech recognition unit 221 acquires the speech signal spoken by the visitor and collected by the sound collection unit 11.

(Step S2) The speech recognition unit 221 performs a sound source localization process, a noise suppression process, a speech zone detection process, a sound source separation process, and a speech recognition process with respect to the acquired speech signal.

(Step S3) The language comprehension unit 223 calculates a speech feature quantity of the separated speech signal of the frame with respect to the recognized result output by the speech recognition unit 221. Subsequently, the language comprehension unit 223 performs a language comprehension process by using the calculated speech feature quantity and a speech recognition model stored by the language comprehension unit 223. Subsequently, the language comprehension unit 223 generates text data representing the recognition result as the speech contents of each sound source. Subsequently, the language comprehension unit 223 performs a dependency parsing with respect to the text data and extracts a noun. Subsequently, when the action generation unit 261 starts to produce the speech information indicating inquiry about things to be done, the visitor recognition unit 21 extracts a noun indicating the affiliation of the customer (company name, department name, and the like) and a noun indicating the name of the customer with respect to the noun of the text data recognized by the language comprehension unit 223 with reference to a customer database stored by the customer DB 23 (visitor recognition step). Subsequently, when the action generation unit 261 starts to produce the speech information indicating inquiry about things to be done, the receiving person recognition unit 22 extracts a noun excluding the noun indicating the affiliation of the customer and the noun indicating the name of the customer, from the noun of the text data. Subsequently, the receiving person recognition unit 22 extracts a noun indicating the affiliation of the receiving person and a noun indicating the name of the receiving person with respect to the extracted noun by searching a staff database stored by the receiving person contact information DB 25 to thereby recognize the receiving person (receiving person recognition step).

(Step S4) When the visitor recognition unit 21 outputs the noun of the affiliation and the name of the visitor, and the receiving person recognition unit 22 outputs the noun of the affiliation and the name of the receiving person, the action generation unit 261 outputs a command of selecting the receiving person to the call person selection unit 262. Subsequently, in response to the receiving person selection command output by the action generation unit 261, the call person selection unit 262 selects a receiving person of the noun of the affiliation and the name of the receiving person output by the receiving person recognition unit 22.

(Step S5) The call person selection unit 262 searches the receiving person contact information DB 25 and determines whether or not the selected receiving person is at the office. The call person selection unit 262 causes the process to proceed to Step S6 when it is determined that the receiving person is at the office (Step S5; YES). The call person selection unit 262 causes the process to proceed to Step S8 when it is determined that the receiving person is not at the office (Step S5; NO).

(Step S6) The notification unit 40 acquires the phone number output by the receiving person selection unit 26 and calls a terminal 45 that corresponds to the acquired phone number (notification step, substitute receiving person notification step).

(Step S7) The notification unit 40 determines whether or not the called terminal 45 answers (there is a response). The notification unit 40 transmits the speech signal of the visitor to the receiving person and terminates the process when it is determined that the terminal 45 answers (Step S7; OK). The notification unit 40 causes the process to proceed to Step S8 when it is determined that the terminal 45 does not answer (Step S7; NG).

(Step S8) When the receiving person is absent or when the terminal 45 does not answer, the call person selection unit 262 searches the receiving person contact information DB 25 and re-extracts a receiving person associated with the receiving person to thereby extract a substitute receiving person (substitute receiving person selection step). After the extraction, the call person selection unit 262 causes the process to return to Step S5.

Then, the receiving person extraction and call processes are terminated.

A specific example of the process shown in FIG. 8 is described with reference to FIG. 6.

When a visitor calls Mr. Tanaka (person ID=1) at the reception, the reception system 1 first confirms that Mr. Tanaka of the person ID=1 is at the office and calls the terminal 45 of Mr. Tanaka (notification step). Then, when the terminal 45 of Mr. Tanaka does not respond (does not answer the phone), the reception system 1 selects, as a substitute receiving person, project member (1) (person ID=101) having the highest closeness degree and having a first-place priority level with reference to the social graph and calls the terminal 45 of the substitute receiving person (substitute receiving person notification step). If the terminal 45 of the project member (1) (person ID=101) does not respond, the reception system 1 re-selects, as the substitute receiving person, project member (2) (person ID=23) having a second-place priority level and calls the terminal 45 of the substitute receiving person (substitute receiving person notification step). The reception system 1 may preset an upper limit of the number of times of re-selecting the substitute receiving person. Alternatively, the reception system 1 may call a plurality of substitute receiving persons simultaneously. For example, when two substitute receiving persons are called, and both of the two persons respond (answer the phone), the reception system 1 may transmit the visitor's message only to a person having a higher priority level.

As described above, according to the present embodiment, it is possible to notify the substitute receiving person of the visit of the visitor when the receiving person is absent, and therefore, it is possible to reduce a time during which the visitor is caused to wait. Further, according to the present embodiment, it is possible to save a response job performed by an operator or a receptionist. Further, according to the present embodiment, it is possible to set an appropriate substitute receiving person depending on the attendance information of the receiving person.

Further, according to the present embodiment, it is possible to set a substitute receiving person having a close relationship with the receiving person based on the social graph. Further, according to the present embodiment, it is possible to set an appropriate substitute receiving person depending on an attendance state of the receiving person. Further, according to the present embodiment, it is possible to set a substitute receiving person based on the outgoing and incoming call history (at least one of the outgoing call history and the incoming call history) of the extension phone (alternatively, a telephone between staff members in a company), and therefore, it is possible to set a substitute receiving person having a deep relationship with the receiving person. Further, according to the present embodiment, it is possible to set a substitute receiving person based on the meeting history, and therefore, it is possible to set a substitute receiving person having a deep relationship with the receiving person. Further, according to the present embodiment, it is possible to set a substitute receiving person having a deep relationship with the receiving person based on observed history based on the image recognition result.

The above embodiment is described using an example in which the reception system 1 selects the substitute receiving person when the receiving person is absent; however, the embodiment is not limited thereto.

For example, the receiving person selection unit 26 of the reception system 1 may display names of a plurality of substitute candidates on the image display unit 51, and the visitor may select the substitute receiving person.

Next, an example of an image at the time of substitute receiving person selection displayed on the image display unit 51 is described.

FIG. 9 is a view showing an example of an image g201 displayed on the image display unit 51 at the time of substitute receiving person selection according to the present embodiment. The example shown in FIG. 9 is an example in which a comprehension result with respect to each of two items (the affiliation of a person in charge and the name of a person in charge) is displayed on the image display unit 51, and a visitor operates the touch panel input unit 52 to select a substitute receiving person. A button is allocated for each field in the region surrounded by a chain line g221. The example shown in FIG. 9 is an example in which three substitute receiving persons are displayed.

The region surrounded by a chain line g211 is an image showing the affiliation of a visited person in charge (the receiving person or the substitute receiving person).

The region surrounded by a chain line g212 is an image for selecting the name of a visited person in charge. The receiving person selection unit 26 may also display the photograph of the substitute receiving person's face on the image display unit 51.

When a desired person in charge is displayed, the visitor selects the name of the person in charge from the image of FIG. 9 displayed on the image display unit 51 by operating the touch panel input unit 52. When a desired person in charge is not displayed, the visitor selects "not available" by operating the touch panel input unit 52. For example, when there are a plurality of persons of which the closeness degree of the substitute receiving person is a value in a predetermined range, the receiving person selection unit 26 may display names of a plurality of substitute receiving persons or the like on the image display unit 51. Alternatively, the receiving person selection unit 26 may display names of a plurality of substitute receiving persons or the like on the image display unit 51 when a substitute receiving person having a first-place priority level does not respond.

As described above, according to the present embodiment, the name of a person estimated to be associated with the receiving person can displayed (may be displayed to include the affiliation, or may be displayed to include also the photograph of the person's face) on the image display unit 51 and can be selected by the visitor, and therefore, the visitor can set a desired substitute receiving person.

A program for realizing the whole or part of the function of the reception unit 10, the action performing unit 20, or the notification unit 40 in the embodiment of the invention may be recorded in a computer-readable recording medium, and the program recorded in the recording medium may be read into and executed on a computer system to thereby perform a variety of processes such as selection of the receiving person, selection of the substitute receiving person, and calling to the receiving person or the substitute receiving person. It is assumed that the "computer system" used herein includes an OS or hardware such as peripherals. It is also assumed that the term "computer system" includes a WWW system including a homepage provision environment (or a display environment). The term "computer-readable recording medium" refers to a portable medium such as a flexible disk, a magneto-optical disk, a ROM, and a CD-ROM, or a storage device such as a hard disk embedded in the computer system. It is also assumed that the term "computer-readable recording medium" includes a medium which holds a program for a given time such as a volatile memory (RAM) in the computer system which becomes a server or a client when a program is transmitted through a network such as the Internet or a communication line such as a telephone line.

The program may be transmitted from the computer system which stores the program in the storage device or the like to other computer systems through a transmission medium or through transmission waves in the transmission medium. The term "transmission medium" which transmits the program refers to a medium which has a function of transmitting information, for example, a network (communication network) such as the Internet or a communication line such as a telephone line. The program may be a program which can realize part of the above-described functions. The program may be a so-called differential file (differential program) which can realize the above-described functions by a combination with a program already recorded in the computer system.

Although the embodiment of the invention has been described and shown in the drawings, the invention is not limited to the above-described embodiment, and addition, omission, and substitution of the configuration and other changes can be made without departing from the scope of the invention.

The invention claimed is:

1. A reception system, comprising at least one processor configured to function as:
   a visitor recognition unit that recognizes a visitor;
   a receiving person recognition unit that recognizes a receiving person that corresponds to the visitor based on a speech signal spoken by the visitor;
   a receiving person contact information storage unit that stores contact information of the receiving person;
   a notification unit that sends a notice indicating that the visitor has arrived, to a terminal which corresponds to the contact information of the receiving person stored by the receiving person contact information storage unit; and
   a receiving person selection unit that selects contact information of a substitute receiving person associated with the receiving person in a case where the receiving person is absent when the notification unit sends the notice to the terminal which corresponds to the contact information of the receiving person,
   wherein the notification unit sends the notice to a terminal which corresponds to the contact information of the substitute receiving person selected by the receiving person selection unit when the receiving person is absent.

2. The reception system according to claim 1, wherein the receiving person selection unit sets the substitute receiving person depending on information based on an attendance state of the receiving person.

3. The reception system according to claim 1, wherein the receiving person selection unit sets the substitute receiving person based on a social graph indicating a relationship between the receiving person and a person associated with the receiving person.

4. The reception system according to claim 3, wherein the social graph includes a closeness degree representing the strength of the relationship between the receiving person and the person associated with the receiving person, and
the receiving person selection unit sets the substitute receiving person in the order of highest to lowest of the closeness degree.

5. The reception system according to claim 4, wherein the receiving person selection unit calculates the closeness degree by using at least one of an outgoing call history and an incoming call history of an extension phone of the receiving person.

6. The reception system according to claim 4, wherein the receiving person selection unit calculates the closeness degree based on a meeting history attended by the receiving person.

7. The reception system according to claim 4, wherein the receiving person selection unit sets a plurality of the substitute receiving persons in the order of highest to lowest of the closeness degree and sends the notice indicating that the visitor has arrived, simultaneously to terminals which correspond to the selected plurality of the substitute receiving persons via the notification unit when the receiving person is absent.

8. The reception system according to claim 4, comprising:
an imaging unit; and
an image recognition unit that recognizes a person based on an image captured by the imaging unit, wherein
the receiving person selection unit calculates, based on a result recognized by the image recognition unit, at least one of the length of time and the number of times for which the person associated with the receiving person is together with the receiving person and calculates the closeness degree based on at least one of the calculated length of time and the calculated number of times.

9. The reception system according to claim 1, comprising:
an image display unit; and
a touch panel input unit, wherein
the receiving person selection unit displays names of a plurality of persons having a strong relationship with the receiving person on the image display unit and sets, as the substitute receiving person, a person that corresponds to a name selected according to selection by the visitor.

10. A reception method in a reception system having a receiving person contact information storage unit that stores contact information of a receiving person with respect to a visitor, the method comprising:
   (a) by way of a visitor recognition unit, recognizing the visitor;
   (b) by way of a receiving person recognition unit, recognizing a receiving person that corresponds to the visitor based on a speech signal spoken by the visitor;
   (c) by way of a notification unit, sending a notice indicating that the visitor has arrived, to a terminal which corresponds to the contact information of the receiving person stored by the receiving person contact information storage unit;
   (d) by way of a receiving person selection unit, selecting contact information of a substitute receiving person associated with the receiving person in a case where the receiving person is absent when sending the notice to the terminal which corresponds to the contact information of the receiving person in (c); and
   (e) by way of the notification unit, sending the notice to a terminal which corresponds to the contact information of the substitute receiving person selected in (d) when the receiving person is absent,
wherein the reception method is performed using at least one processor configured to function as the visitor recognition unit, the receiving person recognition unit, the notification unit, the receiving person selection unit, and the notification unit.

* * * * *